March 11, 1958     J. W. HOLDEMAN     2,826,098
TRANSMISSION
Filed Feb. 16, 1955
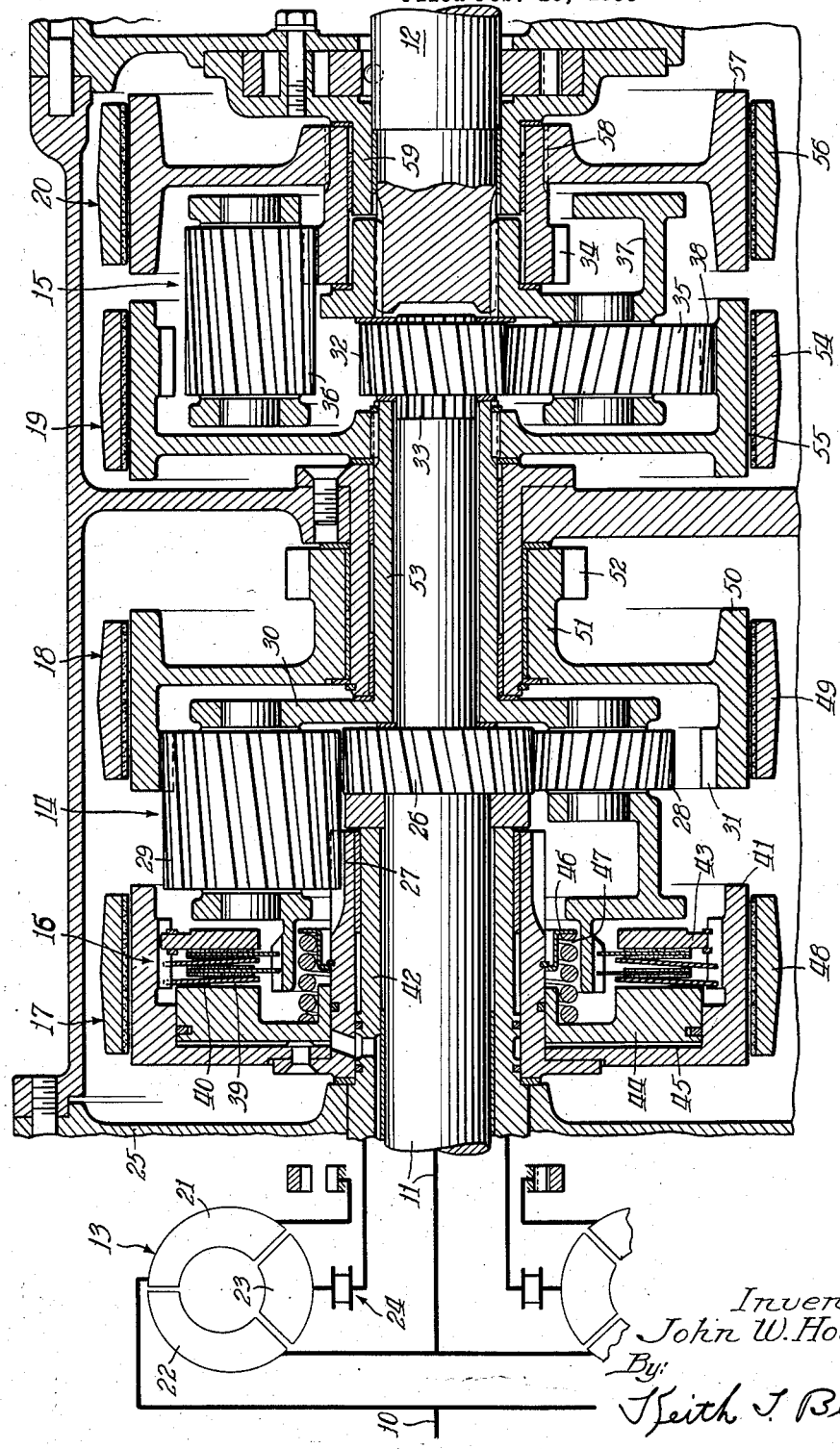
Inventor:
John W. Holdeman
By:
Keith J. Bleuer Atty.

United States Patent Office 2,826,098
Patented Mar. 11, 1958

2,826,098

TRANSMISSION

John W. Holdeman, Detroit, Mich., assignor to Borg-Warner Corporation, Chicago, Ill., a corporation of Illinois Application February 16, 1955, Serial No. 488,534

4 Claims. (Cl. 74—759)

This invention relates to transmissions for automotive vehicles and in particular for trucks.

The object of this invention is to provide a four speed transmission having a plurality of friction engaging elements each of which is engaged exclusive of the others for providing the respective drives through the transmission.

A further object of this invention is to provide a four speed transmission which is capable of simple, rugged construction and which provides substantially constant ratio steps between consecutive ones of the forward speed drives.

A still further object of this invention is to provide a four speed transmission wherein there are no clutch-to-clutch shifts when the transmission is changed from one speed drive to another speed drive thus making for much smoother operation.

These and other objects and features of the invention will become apparent from the following description and drawing in which:

The single figure of the drawing is a longitudinal view through a transmission embodying the principles of the invention showing some parts in section and some parts schematically.

Referring to the drawing, the transmission comprises an input shaft 10, an intermediate drive shaft 11 and an output shaft 12. The shafts are arranged coaxially, and the input shaft 10 is driven by the vehicle engine while the output shaft 12 is arranged, through suitable means, to drive the driven wheels of the vehicle. The transmission includes a torque converter, generally indicated at 13, a first double pinion planetary gear set 14, a second double pinion planetary gear set 15, a multiple disc friction clutch 16, and four friction brakes 17, 18, 19 and 20.

The hydraulic torque converter 13 comprises a bladed impeller element 21 connected to be driven by the input shaft 10, a bladed turbine element 22, fixed with respect to the intermediate shaft 11, and a bladed stator element 23. The torque converter is constructed in accordance with well-known practice with the blades of the elements 21, 22 and 23 disposed in a common fluid circuit, so that when the impeller element 21 is driven, the turbine element 22 is driven by means of the fluid which is circulated by rotation of the impeller element, and the stator element 23 functions to change the direction of flow of the fluid so that the turbine element is driven at a greater torque than is impressed on the impeller element 21.

A one-way free-wheeling brake 24 of well-known sprag or roller construction is provided between the stator element 23 and the casing 25 of the transmission. The brake 24 is so arranged to prevent rotation of the stator element 23 in a direction which is reverse to that of the drive or input shaft 10.

As is well-known with converters of this type, when the rotation of the turbine element increases to a certain speed, the reaction of the fluid on the stator element reverses thus tending to rotate the stator element in the forward direction and the one-way brake releases. Thereafter, the unit 13 functions as a simple fluid coupling driving the turbine element at no increase in torque.

The double pinion planet gear set 14 comprises a sun gear 26 formed on or splined to the intermediate shaft 11, a sun gear 27, a plurality of short planet gears 28, a plurality of long planet gears 29, a planet carrier 30 and a ring gear 31. The sun gear 26 meshes with the short planet gears 28 and each of the gears 28 meshes with one of the long planet gears 29. The gears 29 also mesh with the sun gear 27 and the ring gear 31.

The double pinion planet gear set 15 comprises a sun gear 32, which is splined at 33 to the intermediate shaft 11, a sun gear 34, a plurality of short planet gears 35, a plurality of long planet gears 36, a planet carrier 37 and a ring gear 38. The sun gear 32 meshes with the short planet gears 35, which in turn also mesh with the ring gear 38. The long planet gears 36 mesh with the sun gear 34, and each of the gears 36 also meshes with one of the planet gears 35.

The friction clutch 16 comprises a plurality of clutch plates 39 and a plurality of interleaved friction plates 40, each friction plate being provided with suitable friction facings. The clutch plates 39 are splined to the interior of a hollow drum 41 which is connected to the sun gear 27. The sun gear 27 and likewise the drum 41 are mounted concentrically to the intermediate shaft 11 for relative rotation therewith, being rotatably supported by a bearing sleeve 42 fixed with respect to the casing 25. The friction discs 40 are splined to the planet carrier 30 of the planet gear set 14. A backing plate 43 is fixed within the drum 41 and an annular piston 44 is slidably disposed within an annular cavity 45 on the other side of the packed discs 39 and 40. The piston functions to pack the discs 39 and 40 together in frictional engagement between the piston 44 and backing plate 43 when fluid pressure is supplied to the cavity 45. A spring retainer 46 is fixed to the sun gear 27, and a coil spring 47 is disposed between the piston 44 and retainer 46 for yieldably holding the piston 44 in its clutch disengaging position when fluid under pressure is no longer supplied to the cavity 45.

The friction brake 17 comprises a flexible brake band 48 which is adapted to frictionally engage the outer periphery of the drum 41. The friction brake 18 comprises a flexible brake band 49 which is adapted to frictionally engage a drum 50 formed on the ring gear 31 of the planet gear set 14, the ring gear 31 also comprising a bearing sleeve portion 51 for supporting the ring gear 31 with respect to the casing 25. A power take-off gear 52, from which power may be derived to operate various auxiliary apparatus, is formed on the end of the sleeve portion 51.

The friction brake 19 comprises a flexible brake band 54 adapted to frictionally engage a drum surface 55, formed on the ring gear 38 of the planet gear set 15. The ring gear 38 is splined to a sleeve extension 53 of the planet carrier 30 of the planet gear set 14.

The friction brake 20 comprises a flexible brake band 56 adapted to frictionally engage a brake drum 57 which is splined at 58 to the sun gear 34 of the planet gear set 15. The sun gear 34 is mounted concentrically to the output shaft 12 for relative rotation therewith and has a bearing member 59 connected to the casing 25 interposed therebetween. The friction brakes are adapted to be engaged by any well-known means such as servomotors (not shown).

In all speed drives, the input shaft 10 will be imparted to the intermediate shaft 11 by means of the torque converter 13.

In the neutral position of the transmission, no friction element is engaged and therefore the output shaft 12 is not rotated and there is no power flow through the transmission.

First speed drive is completed by engaging the friction brake 19 which holds the ring gear 38 against rotation, so that the ring gear 38 constitutes a reaction element for the gear set 15. For this speed, the gear set 15 acts as a simple planetary, with the drive being through the sun gear 32 which is splined to the intermediate shaft 11, the planet gears 35 and the planet carrier 37 to the output shaft 12. The planet carrier 37 and the output shaft 12 will rotate in the forward direction at a speed which is reduced to that of the intermediate shaft 11.

To complete the second speed drive, the brake 20 is engaged and the brake 19 is disengaged. The friction brake 20 holds the sun gear 34 against rotation, so that the sun gear 34 functions as a reaction element for the planet gear set 15. The drive is through the intermediate shaft 11, the sun gear 32, the planet gears 35, the planet carrier 37, to the output shaft 12. The planet carrier 37 and the output shaft 12 will rotate in the forward direction at a speed which is reduced from that of the intermediate shaft 11 but is higher than that of the shaft 12 for the first speed drive.

To complete the third speed forward drive, the friction brake 17 is engaged and the friction brake 20 is disengaged. The friction brake 17 holds the sun gear 27 against rotation so that the sun gear 27 functions as a reaction element for the planet gear set 14.

The power flows in two paths, one path being through the sun gear 26, the planet gears 28 and 29, the planet carrier 30 to the ring gear 38 of the planet gear set 15 and the other path being to the sun gear 32 of the gear set 15 directly from the shaft 11. The drive is combined in the planet gear set 15, with the ring gear 38 driving the planet gears 35 and the sun gear 32 also driving these planet gears 35, so that the carrier 37 is driven and drives the shaft 12. The planet gear set 14 is so constructed that when the brake 17 holds the sun gear 27 stationary, the carrier 30 is driven at a reduced speed in the forward direction so that the ring gear 38 rotating at this same reduced speed causes the carrier 37 to be rotated at a speed which is reduced with respect to that of the shaft 11.

To complete the fourth speed forward drive, the clutch 16 is engaged and the friction brake 17 is disengaged. The clutch 16 locks up the planet gear set 14 by connecting together the sun gear 27 and the planet gear carrier 30 so that the speed of rotation of the planet carrier 30 will be the same as that of the intermediate shaft 11. The ring gear 38 will therefore also rotate at the same speed as the intermediate shaft 11. The sun gear 32 of the planet gear set 15 will also rotate at the same speed as the intermediate shaft 11 being splined thereon. Since the sun gear 32 and the ring gear 38 of the planet gear set 15 are rotating at the same speed as the intermediate shaft 11, the planet carrier 37 and the output shaft 12 will rotate at the same speed.

To complete the reverse speed drive, the friction brake 18 is engaged and the other friction engaging devices are disengaged. The friction brake 18 holds the ring gear 31 against rotation, so that the ring gear functions as a reaction element for the planet gear set 14. The power flows in two paths, one path being through the sun gear 26, the planet gears 28 and 29, the planet carrier 30 to the ring gear 38 of the planet gear set 15 and the other path being to the sun gear 32 of the gear set 15 directly from the shaft 11. The drive is combined in the planet gear set 15, with the ring gear 38 driving the planet gears 35 and the sun gear 32 also driving these planet gears 35, so that the carrier 37 is driven and drives the shaft 12. The planet gear set 14 is so constructed that when the brake 18 holds the ring gear 31 stationary, the carrier 30 is driven in a reversed direction to that of the shaft 11 and at a reduced speed to that of the shaft 11, which reduced speed is higher than the speed of the carrier 30 in the third speed forward drive, so that the ring gear 38 will rotate at this same reverse speed. The sun gear 32 will rotate in the forward direction being splined to the shaft 11. The carrier 37 due to this differential of rotation will be rotated in a reverse direction and at a speed which is reduced with respect to that of the shaft 11.

Assuming that there is a 1000 R. P. M. input impressed on the transmission, the table reproduced below shows the particular speed of rotation of each of the elements in the transmission and each of these is indicated as being in the forward or reverse direction. This table also shows the number of teeth on each gear, which are disclosed merely as examples, it being contemplated that other gear sizes may be selected to produce the same or a different ratio step.

*R. P. M. of planetary gear set (with 1000 R. P. M. input)*

| Element | No. Gear Teeth | Speeds | | | | | |
|---|---|---|---|---|---|---|---|
| | | Reverse | First | Second | Third | Drive | Neutral |
| Sun Gear 26 | 36 | 1,000 | 1,000 | 1,000 | 1,000 | 1,000 | 1,000 |
| Planet Gear 28 | 34 | −1,588 | −1,059 | −865 | −551 | 0 | −1,324 |
| Planet Gear 29 | 34 | 1,588 | 1,059 | 865 | 551 | 0 | 1,324 |
| Sun Gear 27 | 39 | −1,885 | −923 | −572 | 0 | 1,000 | −1,404 |
| Ring Gear 31 | 108 | 0 | 333 | 455 | 653 | 1,000 | 166 |
| Planet Carrier 30 | 0 | −500 | 0 | 183 | 480 | 1,000 | −250 |
| Sun Gear 32 | 27 | 1,000 | 1,000 | 1,000 | 1,000 | 1,000 | 1,000 |
| Planet Gear 35 | 40 | −810 | −540 | −441 | −281 | 0 | −675 |
| Planet Gear 36 | 26 | 1,246 | 830 | 679 | 432 | 0 | 1,038 |
| Sun Gear 34 | 51 | −835 | −224 | 0 | 364 | 1,000 | −529 |
| Ring Gear 38 | 108 | −500 | 0 | 183 | 480 | 1,000 | −250 |
| Planet Carrier 37 | 0 | −200 | 200 | 346 | 584 | 1,000 | 0 |

The below reproduced table sums up the operation of the transmission showing the friction element engaged for each drive, the approximate ratios (for the gears set out in the above table) and the ratio step between successive forward drives.

| Speed Range | Reaction Elements Applied | | | | | Approx. Ratios | Ratio Step |
|---|---|---|---|---|---|---|---|
| | Clutch 16 | Brake 17 | Brake 18 | Brake 19 | Brake 20 | | |
| Reverse | | | x | | | −5.00 | |
| Low | | | | x | | 5.00 | |
| Second | | | | | x | 2.89 | 1.73 |
| Third | | x | | | | 1.71 | 1.69 |
| High | x | | | | | 1.00 | 1.71 |

Thus, there is described a transmission wherein each gear ratio has its own friction element, and for each drive, only one friction element is engaged. There is provided a transmission wherein the up or down shifting is smooth since there are no clutch to clutch shifts; there being only one clutch employed.

Since only one clutch is employed, no complex collector ring construction is necessary and, also, no mainshaft drilling is required, thus making a more rugged and simple transmission, and one which may be produced at low cost.

There is provided a substantially constant ratio step between consecutive forward speed drives; i. e., by multiplying one speed ratio by the ratio step, the next succeeding higher speed ratio may be determined.

While the invention has been described in connection with one specific embodiment thereof, it is to be understood that this is by way of illustration and not by way of limitation, it being contemplated that other gear sizes, other speed ratios and other ratio steps may be chosen within the purview of the invention, and the scope of the invention is defined solely by the appended claims which should be construed as broadly as the prior art will permit.

I claim:

1. In a transmission, the combination of a drive shaft, a driven shaft, means for providing a low first and a higher second and a still higher third reduced speed drives and a fourth one-to-one drive between said shafts, said means for providing said first and second and third speed forward drives each comprising a friction brake and said means for providing said fourth speed drive comprising a friction clutch each of which is engaged exclusively of the others for completing the respective drives, said first named means also including a first and a second planetary gear set, each of said gear sets comprising two sun gears and a first planet gear in mesh with one of said sun gears and a second planet gear in mesh with the said first planet gear and also with said other sun gear and a planet gear carrier, said second gear set also comprising a ring gear in mesh with its said first planet gear, a sun gear of each of said planetary gear sets being connected with said drive shaft, the carrier of said first gear set being connected to the ring gear of said second gear set, the carrier of said second gear set being connected to said driven shaft, the said friction brakes being respectively effective on the ring gear of said second gear set and on the other sun gear of said second gear set and on the other sun gear of said first gear set and said friction clutch connecting together two elements of said first gear set.

2. In a transmission, the combination of a drive shaft, a driven shaft, means for providing a low first and a higher second and a still higher third reduced forward speed drives and a fourth one-to-one drive between said shafts, said means for providing said first and second and third speed forward drives each comprising a friction brake and said means for providing said fourth speed drive comprising a friction clutch each of which is engaged exclusively of the others for completing the respective drives, said first named means also including a first and a second planetary gear set, each of said planetary gear sets comprising first and second sun gears and a first planet gear in mesh with said first sun gear and a second planet gear in mesh with said second sun gear and also with said first planet gear and a planet gear carrier, said second gear set also comprising a ring gear in mesh with its said first planet gear, said second sun gear of said first gear set and said first sun gear of said second gear set being connected with said drive shaft, said carrier of said first gear set being connected with said ring gear of said second gear set, said carrier of said second gear set being connected with said driven shaft, said brakes being respectively provided on said ring gear of said second gear set and on said second sun gear of said second gear set and on said first sun gear of said first gear set and said clutch connecting together said carrier of said first gear set and said first sun gear of said first gear set.

3. In a transmission, the combination of a drive shaft, a driven shaft, means for providing a low first and a higher second and a still higher third reduced speed forward drives and a fourth one-to-one drive and also a reverse drive between said shafts, said means for providing said first and second and third speed forward drives and said reverse drive each comprising a friction brake and said means for providing said fourth speed drive comprising a friction clutch each of which is engaged exclusive of the other for completing the respective drives, said first named means also including a first and a second planetary gear set, each of said gear sets comprising a first sun gear and a second sun gear and a ring gear and a first planet gear in mesh with said first sun gear and with said ring gear and a second planet gear in mesh with said second sun gear and with said first planet gear and a planet gear carrier, said second sun gear of said first gear set and said first sun gear of said second gear set being connected with said drive shaft, said carrier of said first gear set being connected with said ring gear of said second gear set, said carrier of said second gear set being connected with said driven shaft, said brakes being respectively effective on said ring gear of said second gear set and on said second sun gear of said second gear set and on said first sun gear of said first gear set and on said ring gear of said first gear set and said clutch connecting together said carrier of said first gear set and said first sun gear of said first gear set.

4. In a transmission, the combination of a drive shaft, a driven shaft, means for providing a low first and a higher second and a still higher third reduced speed forward drives and a fourth one-to-one drive between said shafts, said means for providing said first and second and third speed forward drives each comprising a friction brake and said means for providing said fourth speed drive comprising a friction clutch each of which is engaged exclusively of the others for completing the respective drives, said first named means also including a first planetary gear set and a second planetary gear set, each of said gear sets comprising a first sun gear element and a second sun gear element and a first planet gear in mesh with said first sun gear element and a second planet gear in mesh with said first planet gear and with said second sun gear element and a planet gear carrier element and one of said gear sets comprising in addition a ring gear element in mesh with its said first planet gear, one of said sun gear elements of said two gear sets each being connected with said drive shaft, one of the other elements of said second gear set being connected with said driven shaft, one of the other elements of said first gear set being connected with one of the other elements of said second gear set, said brakes being respectively effective on said last-named connected elements of said first and second gear sets and on the remaining element of said second gear set and on the remaining element of said first gear set, and said clutch connecting together two of said elements of said first gear set.

References Cited in the file of this patent

UNITED STATES PATENTS

| 1,383,988 | De Normanville | July 5, 1921 |
| 1,418,537 | Cotal | June 6, 1922 |
| 2,220,174 | Ravigneaux | Nov. 5, 1940 |
| 2,222,813 | Hale | Nov. 26, 1940 |
| 2,672,767 | Schneider | Mar. 23, 1954 |

FOREIGN PATENTS

| 1,029,576 | France | Mar. 11, 1953 |
| 466,876 | Italy | Nov. 20, 1951 |